(12) United States Patent
Reiners et al.

(10) Patent No.: US 11,092,194 B2
(45) Date of Patent: Aug. 17, 2021

(54) PRESTRESS MEASUREMENT WITH LOAD PIN

(71) Applicant: Schaeffler Technologies AG & Co. KG, Herzogenaurach (DE)

(72) Inventors: Harald Reiners, Aachen (DE); Manuel Herfs, Heinsberg (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 16 days.

(21) Appl. No.: 16/618,447

(22) PCT Filed: Apr. 13, 2018

(86) PCT No.: PCT/DE2018/100351
§ 371 (c)(1),
(2) Date: Dec. 2, 2019

(87) PCT Pub. No.: WO2018/219382
PCT Pub. Date: Dec. 6, 2018

(65) Prior Publication Data
US 2020/0116198 A1    Apr. 16, 2020

(30) Foreign Application Priority Data

May 30, 2017    (DE) .......................... 102017111743.1

(51) Int. Cl.
*F16C 19/36*    (2006.01)
*F16C 25/08*    (2006.01)
(Continued)

(52) U.S. Cl.
CPC .......... *F16C 19/522* (2013.01); *F16C 19/364* (2013.01); *F16C 25/08* (2013.01);
(Continued)

(58) Field of Classification Search
CPC ...... F16C 19/16; F16C 19/364; F16C 19/552; F16C 25/06; F16C 25/08; F16C 41/007;
(Continued)

(56) References Cited

U.S. PATENT DOCUMENTS 4,023,868  A  *  5/1977  Miki .................... F16C 19/364
                                                      384/563
4,033,645  A  *  7/1977  Yamada ................. F16C 25/08
                                                      384/563
(Continued)

FOREIGN PATENT DOCUMENTS

CN            1054124        8/1991
CN            1405543        3/2003
(Continued)

*Primary Examiner* — Marcus Charles
(74) *Attorney, Agent, or Firm* — Volpe Koenig

(57) ABSTRACT

A bearing assembly (1) for preload measurement, having at least one rotary element (2, 3), wherein the at least one rotary element (2, 3) includes a radial (4) and/or axial receptacle (5) for a rolling bearing (6), wherein the at least one rotary element (2, 3) includes at least one measurement device (7, 8) in the region of the receptacle (4, 5) for measuring the rolling bearing preload, and wherein the at least one measurement device (7, 8) is located inside the at least one rotary element (2, 3).

20 Claims, 1 Drawing Sheet

(51) Int. Cl.
*F16C 41/00* (2006.01)
*F16C 19/52* (2006.01)

(52) U.S. Cl.
CPC ........ *F16C 41/007* (2013.01); *F16C 2229/00* (2013.01); *F16C 2233/00* (2013.01); *F16C 2240/14* (2013.01)

(58) Field of Classification Search
CPC .............. F16C 2229/00; F16C 2233/00; F16C 2240/14; F16C 35/067
USPC .................................. 384/448, 546, 565, 571
See application file for complete search history.

(56) References Cited

U.S. PATENT DOCUMENTS

| | | | |
|---|---|---|---|
| 4,960,333 A | 10/1990 | Faye et al. | |
| 5,263,372 A | 11/1993 | Matsuzaki et al. | |
| 6,926,445 B2 | 8/2005 | Sato et al. | |
| 8,136,996 B2 * | 3/2012 | Lemmers | F16C 25/08 384/517 |
| 8,827,564 B2 * | 9/2014 | Hamada | F16C 33/588 384/571 |
| 9,915,287 B2 | 3/2018 | Hofmann et al. | |
| 2015/0043858 A1 * | 2/2015 | Aust | F16C 19/543 384/558 |
| 2015/0233420 A1 | 8/2015 | Bogvad et al. | |
| 2017/0074317 A1 * | 3/2017 | Reichert | F16C 25/08 |
| 2017/0210412 A1 * | 7/2017 | Segawa | B62D 5/0409 |
| 2017/0284459 A1 * | 10/2017 | Sugimoto | F16C 19/184 |

FOREIGN PATENT DOCUMENTS

| | | | | |
|---|---|---|---|---|
| CN | 105658970 | | 6/2016 | |
| DE | 1911759 | | 9/1970 | |
| DE | 3525691 | | 2/1986 | |
| DE | 4221035 | | 1/1993 | |
| DE | 102006008176 | | 8/2007 | |
| DE | 102008009536 | | 8/2009 | |
| DE | 102008034484 | | 1/2010 | |
| DE | 102009058355 | | 6/2011 | |
| DE | 102010035265 | | 3/2012 | |
| DE | 102012210419 | | 12/2013 | |
| DE | 102013006966 | | 10/2014 | |
| EP | 1134443 | | 9/2001 | |
| EP | 2093439 A1 | * | 8/2009 | ............ F16C 25/08 |
| EP | 2280180 A1 | * | 2/2011 | ............ F16C 37/007 |
| JP | 2001295838 A | * | 10/2001 | ............ F16C 19/547 |
| JP | 2002213438 A | * | 7/2002 | ............ F16C 33/60 |
| JP | 2006258202 A | * | 9/2006 | ............ F16C 19/364 |
| JP | 2009103629 A | * | 5/2009 | ............... G01L 5/00 |
| JP | 5228607 B2 | * | 7/2013 | ............ F16C 19/543 |
| JP | 2014105807 A | * | 6/2014 | ............ F16C 19/364 |
| JP | 2016075336 A | * | 5/2016 | ............ F16C 19/543 |
| KR | 20100102845 A | * | 9/2010 | ............ F16C 25/06 |
| KR | 20130013259 A | * | 2/2013 | ............ F16C 25/06 |
| WO | WO-2004102018 A1 | * | 11/2004 | ............ F16C 19/52 |
| WO | WO-2008050470 A1 | * | 5/2008 | ............ F16C 25/08 |
| WO | 2012097962 | | 7/2012 | |
| WO | WO-2014194904 A1 | * | 12/2014 | ............ F16C 25/08 |

* cited by examiner

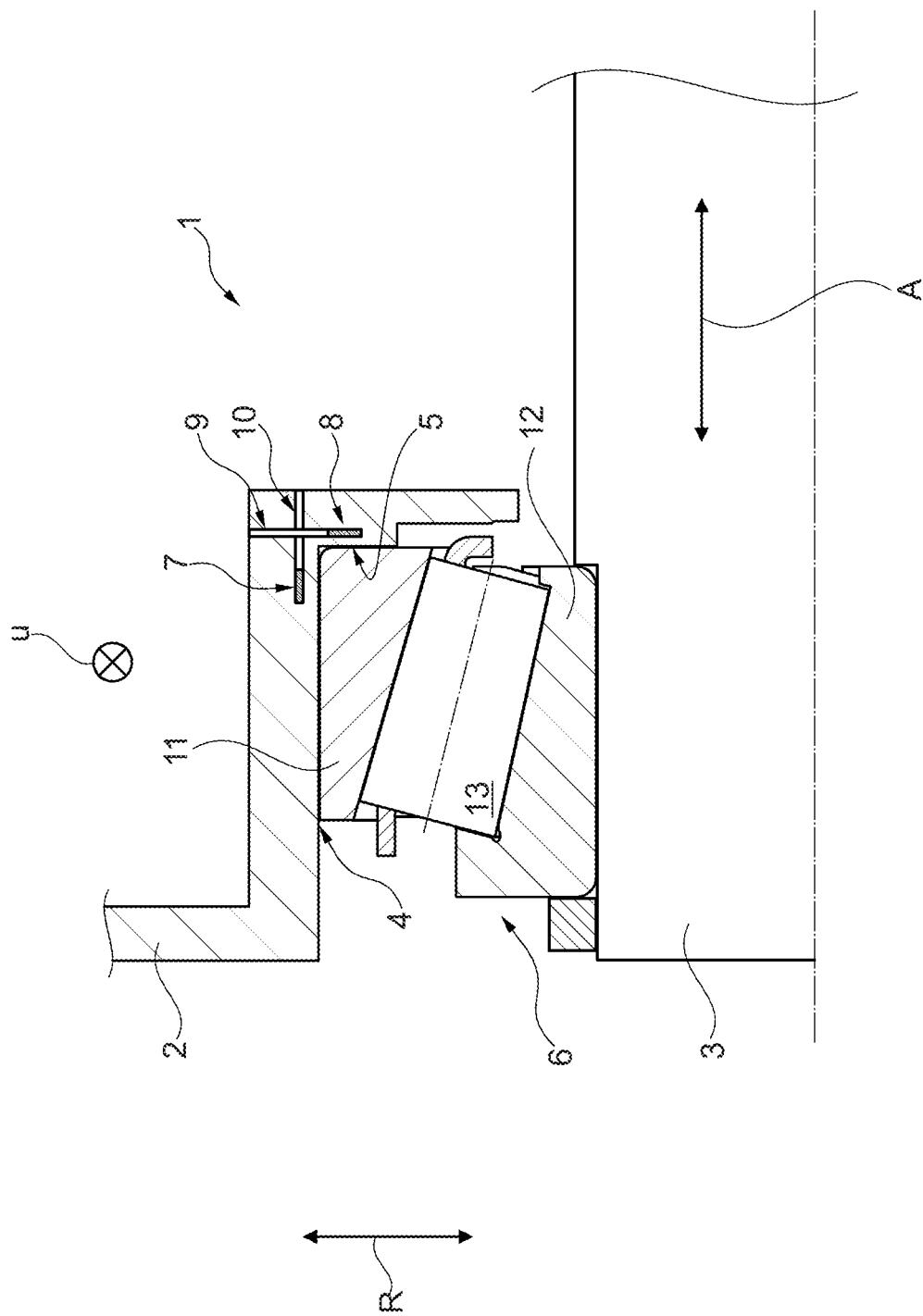

PRESTRESS MEASUREMENT WITH LOAD PIN

CROSS-REFERENCE TO RELATED APPLICATIONS

This application is a 371 National Phase of PCT/DE2018/100351, filed Apr. 13, 2018, which claims the benefit of German Patent Application No. 10 2017 111 743.1, filed May 30, 2017, both of which are incorporated by reference herein as if fully set forth.

BACKGROUND

The disclosure relates to a bearing arrangement having a rotary element that comprises a radial and axial receptacle for a rolling bearing, wherein the rotary element comprises, in the region of the receptacle, a measurement device for measuring the rolling bearing preload.

It is known from the prior art to preload particular types of rolling bearing during fitting.

This is because the correct preload of a rolling bearing improves the running properties thereof and makes a significant contribution toward the life of the rolling bearing.

The preload is currently set during fitting such that there is no longer a gap between the guide rim and rolling element. For this purpose, fitters use for example a feeler gauge.

During the lifetime or during the operating time of the rolling bearing, the preload thereof can no longer be checked.

However, there is an interest in measuring the preload.

Therefore, in the prior art, systems with position sensors are known, which measure the distance of the outer ring and inner ring axially and radially from the bearing housing.

By way of finite element calculations and active calibration, it is thus possible to set the preload and also to monitor the latter during operation.

However, in such systems, the large number of and large installation space for the position sensors cause high costs since, for a bearing, measurements are usually taken at three positions (each offset through 120°) in two directions and thus, for each bearing, six sensors plus an evaluation unit are required.

SUMMARY

Therefore, it is an object of the present disclosure to specify a bearing arrangement for preload measurement, which is producible cost-effectively and easily and requires little installation space.

This object is achieved by one or more features described below and in the claims.

According to the disclosure, a bearing arrangement for preload measurement comprises at least one rotary element, wherein, advantageously, the at least one rotary element comprises a radial and/or axial receptacle for a rolling bearing.

Preferably, the radial and/or axial receptacle is a bearing seat of a rolling bearing.

Preferably, the at least one rotary element comprises a rotating or stationary housing portion. In this way, the rotary element can be for example a housing or a shaft/axle.

It is also advantageous for the at least one rotary element to comprise, in the region of the receptacle, at least one measurement device for measuring the rolling bearing preload.

Furthermore, it is advantageous for the at least one measurement device to be arranged in the interior of the at least one rotary element. In this way, stresses or forces within the at least one rotary element can be sensed easily and quickly, but also precisely.

Preferably, the at least one measurement device comprises a measurement element for force measurement.

Preferably, the measurement element is in the form of a load pin. This makes it possible to easily sense forces that act on a component or on the at least one rotary element. Furthermore, a load pin can also be introduced easily into the at least one rotary element.

It is also preferred for the at least one measurement device to be arranged within the at least one rotary element at locations at which a high level of force is applied. As a result, stresses within the at least one rotary element can be sensed with a high level of precision.

It is also possible for a measurement element of the at least one measurement device to be arranged in a recess, in particular in a bore. In this way, the measurement element can be arranged for example at locations at which a high level of force is applied.

Advantageously, the channel of the recess, in particular the bore channel, is arranged substantially parallel to the axial or radial receptacle of the at least one rotary element.

The expression "substantially parallel" is preferably understood in the present description as meaning that the centerline of the channel of the recess lies within a cylinder with a diameter of 0.05-2 mm that is arranged parallel to the axial or radial receptacle.

It is also advantageous for at least one measurement element to be arranged in a recess. In other words, it is advantageous when two or more measurement elements are arranged within a recess. In this way, within the channel of the recess, a relatively large portion or even the entire channel of the recess can serve to sense forces.

Furthermore, it is preferred for the at least one measurement device to be arranged substantially parallel to the axial or radial receptacle of the at least one rotary element.

The expression "substantially parallel" is preferably understood in the present description as meaning that the centerline of the at least one measurement device lies within a cylinder with a diameter of 0.05-2 mm that is arranged parallel to the axial or radial receptacle.

Preferably, the at least one measurement device is spaced apart from the radial or axial receptacle of the at least one rotary element by between 1 mm and 15 mm, in particular between 3 and 10 mm. In this way, the measurement element, or the at least one measurement device, can be arranged at a location that is advantageously located close to a possible high level of force application.

It is also preferred for a multiplicity of measurement devices to be arranged in the circumferential direction of the at least one rotary element. In this way, it is possible to sense the rolling bearing preload around the circumference or in the tangential direction or in the circumferential direction of the at least one rotary element during fitting, but also during operation.

It is also advantageous for the measurement devices to each be arranged at the same distance from one another in the radial and/or axial direction. In this way, forces that act, or the bearing preload, can be checked and sensed at regular intervals. It is therefore also possible to verify whether the bearing preload is applied or distributed evenly around the circumference of the at least one rotary element or of the rolling bearing.

Furthermore, it is preferred for the at least one measurement device for the radial receptacle to be arranged in an offset manner in the circumferential direction of the at least one rotary element with respect to the at least one measurement device for the axial receptacle. In other words, it is advantageous for a measurement device for a radial receptacle to be arranged in the circumferential direction between two measurement devices for an axial receptacle. Advantageously, a measurement device for the radial receptacle is arranged centrally in the circumferential direction between two measurement devices for the axial receptacle.

It is also advantageous for the at least one measurement device for the radial receptacle to be arranged in a manner offset at most in an angular range of 1 to 10 degrees in the circumferential direction with respect to the at least one measurement device for the axial receptacle. Preferably, an angle or angular range relates to the circumferential direction of the at least one rotary element.

It is also advantageous for the bearing arrangement to comprise a rolling bearing.

Advantageously, the rolling bearing comprises a bearing inner and/or bearing outer element, wherein preferably the bearing inner element is in the form of an inner ring, and/or wherein preferably the bearing outer element is in the form of an outer ring.

Furthermore, it is advantageous for the rolling bearing to be supported on the radial and/or axial receptacle of the at least one rotary element in order to transmit preload forces in the radial and/or axial direction of the at least one rotary element. In this way, forces that act on the rolling bearing can be passed on to the at least one rotary element via the radial and/or axial receptacle.

Preferably, the radial receptacle has a cylindrical shape. In this way, forces in the radial direction can be absorbed.

It is also advantageous for the axial receptacle to be disk-shaped. This configuration makes it possible to absorb forces in the axial direction.

It is furthermore possible for the at least one measurement device to comprise an evaluation unit or elevation electronics for sensing and/or evaluating measured values.

In particular when a measurement element of the at least one measurement device is combined with an evaluation unit or evaluation electronics in order to sense and/or evaluate measured values, it is advantageous for the evaluation unit/evaluation electronics to be arranged on the measurement element.

It is also advantageous for the measurement element of the at least one measurement device to have a wireless connection to an evaluation unit/evaluation electronics in order to transmit sensor data from the measurement element in the form of acting forces without laying cables.

It is also advantageous for the evaluation unit/evaluation electronics to have a wireless connection to a measurement element. In this way, sensor data about forces acting on the measurement element can be received by the evaluation unit/evaluation electronics.

In the following text, the above-described concept of the invention is expressed additionally in different words.

This concept preferably relates—explained in a simplified manner—to a bearing arrangement for preload measurement, having at least one rotary element and a measurement device for measuring the rolling bearing preload, wherein the measurement device is arranged preferably in the interior of the at least one rotary element.

In this case, the solution described herein makes use preferably of forces or deformations of receptacles of the at least one rotary element, which act on the components in question by way of the preload of a rolling bearing.

Advantageously, use is made here of load pins, which were developed by the company Schaeffler Technologies AG & Co. KG. These are advantageously cost-effective to produce and relatively easy to integrate.

More specifically, in a taper roller bearing, for example, both an axial support point on the outer ring and a radial support point on the outer ring of a rolling bearing exist.

In this case, given the preload of the rolling bearing, a certain force is exerted on all the constituents of the bearing, even on the inner and outer ring thereof.

If preferably a plurality of load pins distributed in a circle are now arranged in the vicinity of these support points, or in the vicinity of the outer ring, the forces acting on the outer ring and thus the preload on the rolling bearing can be calculated.

In order to correlate preferably the measured strains with the actual preloads, active calibration of a sensor system is advantageously required. This can be back-calculated for example by applying an axial, known force.

The optimum position of the load pins and the deformation expected there can preferably be calculated by a finite element method.

BRIEF DESCRIPTION OF THE DRAWINGS

The disclosure is explained in more detail in the following text on the basis of an exemplary embodiment in conjunction with an associated drawing, in which, schematically:

The sole FIGURE shows a sectional view of a bearing arrangement according to the invention, having a measurement device.

DETAILED DESCRIPTION

The FIGURE shows a sectional view of a bearing arrangement 1 according to the invention, having a measurement device 7, 8.

More precisely, the FIGURE shows a bearing arrangement 1 for preload measurement, having rotary elements 2, 3, wherein the rotary element 2 comprises a radial 4 and an axial receptacle 5 for a rolling bearing 6 having rolling elements 13.

In other words, the axial receptacle 5 and the radial receptacle 4 act as a bearing seat for the rolling bearing 6.

In the present example, the rotary element 2 is a stationary housing portion, whereas the rotary element 3 is in the form of a shaft.

The FIGURE also shows that the bearing arrangement 1 has a rolling bearing 6 with a bearing inner element 12, or inner ring 12, and a bearing outer element 11, or outer ring 11.

In this case, the rolling bearing 6 is supported on the radial 4 and axial receptacle 5 of the rotary element 2 in order to transmit preload forces in the radial R and axial direction A of the rotary element 2.

It is also apparent from the FIGURE that the radial receptacle 4 has a cylindrical shape and the axial receptacle 5 is disk-shaped. Taking both receptacles 4, 5 together, a shape similar to an "L" results in the sectional view of the FIGURE.

Furthermore, the FIGURE shows that the rotary element 2 has, in the region of each of the receptacles 4, 5, a measurement device 7, 8 for measuring the rolling bearing preload, wherein each measurement device 7, 8 is arranged in the interior of the rotary element 2.

In this case, each measurement device 7, 8 has a measurement element 7, 8 for force measurement, wherein the measurement elements 7, 8 are in the form of load pins.

The measurement elements 7, 8 are in this case each arranged in a bore 9, 10, wherein the corresponding bore channel is arranged substantially parallel to the axial 5 and radial receptacle 4, respectively, of the rotary element 2.

As a result of the introduction of the measurement elements 7, 8 into the bores 9, 10, the respective measurement devices 7, 8 are also arranged substantially parallel to the axial 5 and radial receptacle 4 of the rotary element 2.

In the present example, the measurement elements 7, 8, or the measurement devices 7, 8, are spaced apart from the radial and axial receptacles 4, 5 of the rotary element 2 by between 1.5 and 3.5 mm.

In other words, the measurement devices 7, 8 are arranged within the rotary element 2 at locations at which a high level of force is applied, in order to sense stresses within the rotary element 2 with a high level of precision.

It should be noted that, in the present example, a multiplicity of measurement devices 7, 8 are arranged in the circumferential direction U of the rotary element 2, wherein the measurement devices 7, 8 are arranged in an evenly distributed manner in the circumferential direction U in the radial direction R and axial direction A.

The measurement device 7 for the radial receptacle 4 is also arranged in an offset manner in the circumferential direction U of the rotary element 2 with respect to the measurement device 8 for the axial receptacle 5.

Although not shown in the FIG. 1, each measurement device 7, 8 can have an evaluation unit for sensing and evaluating measured values, wherein the measurement elements 7, 8 can have a wireless connection to the evaluation unit, and wherein the evaluation unit can have a wireless connection to a measurement element.

LIST OF REFERENCE SIGNS

1 Bearing arrangement
2 Rotary element
3 Rotary element
4 Radial receptacle
5 Axial receptacle
6 Rolling bearing
7 Measurement device/measurement element
8 Measurement device/measurement element
9 Recess/bore channel
10 Recess/bore channel
11 Outer ring
12 Inner ring
13 Rolling element
A Axial direction
R Radial direction
U Circumferential direction

The invention claimed is:

1. A bearing arrangement for preload measurement, the bearing arrangement comprising:
at least one rotary element including:
at least one of a radial or axial receptacle for a rolling bearing,
at least one measurement device for measuring the rolling bearing preload located in a region of the at least one of the radial or axial receptacle, and
the at least one measurement device is embedded within an internal area of the at least one rotary element.

2. The bearing arrangement as claimed in claim 1, wherein the at least one measurement device comprises a measurement element for force measurement.

3. The bearing arrangement as claimed in claim 1, wherein the at least one measurement device is arranged within the at least one rotary element at locations at which a higher level of force is applied relative to other locations, in order to sense stresses within the at least one rotary element.

4. The bearing arrangement as claimed in claim 1, wherein a measurement element of the at least one measurement device is arranged in a recess in the at least one rotary element, a channel of the recess is arranged substantially parallel to the at least one of the axial or radial receptacle of the at least one rotary element, and at least one said measurement element is arranged in said recess.

5. The bearing arrangement as claimed in claim 1, wherein the at least one measurement device is arranged substantially parallel to the at least one of the axial or radial receptacle of the at least one rotary element, and the at least one measurement device is spaced apart from the at least one of the radial or axial receptacle of the at least one rotary element by between 1 mm and 5 mm.

6. The bearing arrangement as claimed in claim 1, wherein the at least one measurement device comprises a multiplicity of said measurement devices arranged in a circumferential direction of the at least one rotary element.

7. The bearing arrangement as claimed in claim 6, wherein the measurement devices are each arranged at a same distance from one another in a radial direction or an axial direction.

8. The bearing arrangement as claimed in claim 6, wherein the measurement devices are arranged evenly distributed in at least one of the circumferential direction a radial direction or an axial direction.

9. The bearing arrangement as claimed in claim 1, wherein the at least one of the radial or axial receptacle includes a radial receptacle and an axial receptacle, the at least one measurement device comprises a first measurement device for the radial receptacle and a second measurement device for the axial receptacle, the first measurement device for the radial receptacle is arranged offset in a circumferential direction of the at least one rotary element with respect to the second measurement device for the axial receptacle.

10. The bearing arrangement as claimed in claim 9, wherein the measurement device for the radial receptacle is arranged offset at most in an angular range of 1 to 10 degrees in the circumferential direction with respect to the measurement device for the axial receptacle.

11. The bearing arrangement as claimed in claim 1, wherein the bearing arrangement comprises a rolling bearing, the at least one rotary element comprises a rotating or stationary housing portion, and the rolling bearing comprises at least one of a bearing inner element or a bearing outer element.

12. The bearing arrangement as claimed in claim 11, wherein the bearing inner element comprises an inner ring, and the bearing outer element comprises an outer ring.

13. The bearing arrangement as claimed in claim 11, wherein the rolling bearing is supported on the at least one of the radial or axial receptacle of the at least one rotary element in order to transmit preload forces in the at least one of the radial or axial direction of the at least one rotary element.

14. The bearing arrangement as claimed in claim 13, wherein the at least one of the radial or axial receptacle includes: a radial receptacle having a cylindrical shape, and an axial receptacle that is disk-shaped.

15. The bearing arrangement as claimed in claim 1, wherein the at least one measurement device comprises an evaluation unit for at least one of sensing or evaluating measured values.

16. The bearing arrangement as claimed in claim 15, wherein a measurement element of the at least one measurement device has a wireless connection to the evaluation unit, and the evaluation unit has a wireless connection to the measurement element.

17. A bearing arrangement for preload measurement, the bearing arrangement comprising:
at least one rotary element including:
at least one of a radial or axial receptacle for a rolling bearing,
at least one measurement device for measuring the rolling bearing preload located in a region of the at least one of the radial or axial receptacle, and the at least one measurement device is arranged in an interior of the at least one rotary element, and the measurement element comprises a load pin.

18. A bearing arrangement for preload measurement, the bearing arrangement comprising:
a rotary element including:
a radial receptacle and an axial receptacle for a rolling bearing,
at least one radial force sensor that is adapted to measure the rolling bearing preload located in a region of the radial receptacle,
at least one axial force sensor that is adapted to measure the rolling bearing preload located in a region of the axial receptacle, and
the radial and axial force sensors are embedded within an internal area of the rotary element.

19. The bearing arrangement of claim 18, wherein the at least one radial force sensor is arranged offset in a circumferential direction from the at least one axial force sensor.

20. The bearing arrangement of claim 18, wherein the radial and axial force sensors each comprise respective load pins inserted in bores in the rotary element.

* * * * *